(No Model.)

A. M. DENNISON.
CLOTHES STRAINER.

No. 253,989.      Patented Feb. 21, 1882.

WITNESSES:
Paul A. Staly
Chas. A. Kressman.

INVENTOR
Anna M. Dennison
BY H. Harrison
ATTORNEY.

N. PETERS, Photo-Lithographer, Washington, D. C.

UNITED STATES PATENT OFFICE.

ANNA M. DENNISON, OF CHICAGO, ILLINOIS.

CLOTHES-STRAINER.

SPECIFICATION forming part of Letters Patent No. 253,989, dated February 21, 1882.

Application filed October 27, 1881. (No model.)

*To all whom it may concern:*

Be it known that I, ANNA M. DENNISON, a citizen of the United States, residing at Chicago, in the county of Cook and State of Illinois, have invented a new and useful Clothes-Strainer, of which the following is a specification.

The object of my invention is to provide a device for lifting and straining clothes from a wash-boiler after they are sufficiently boiled, and to protect them from being rusted by said boiler during the boiling process; and my invention consists in the construction and arrangement of parts, as hereinafter more fully set forth.

Figure 1:
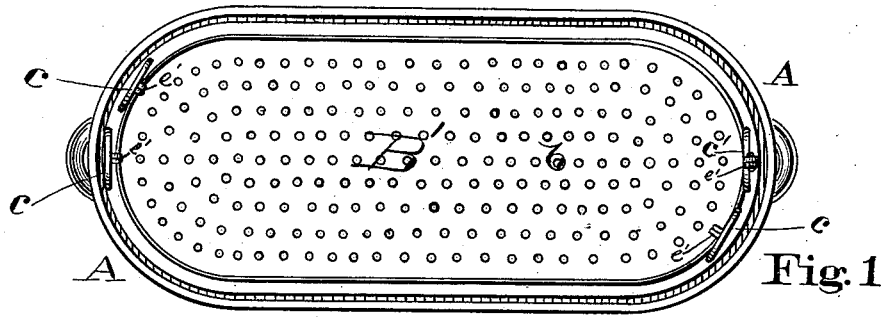
Figure 2:
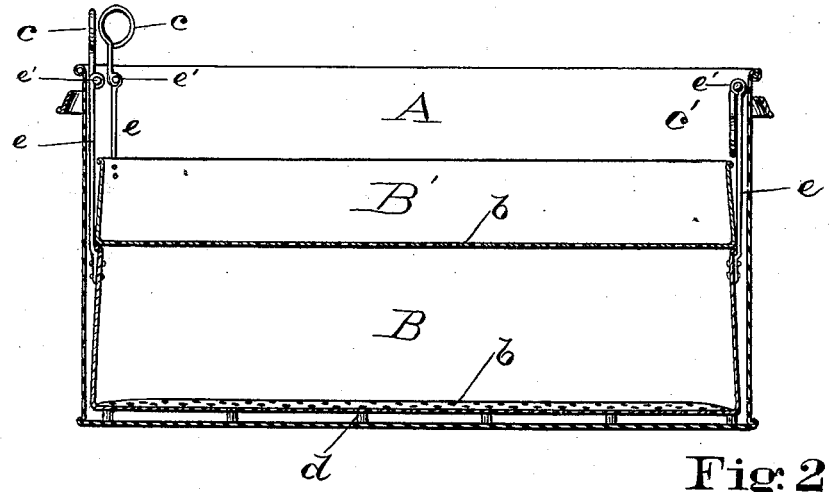
Figure 3:
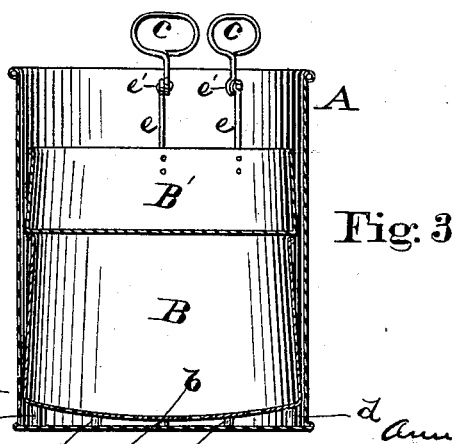

Figure 1 is a plan view of my improved device placed in an ordinary wash-boiler; Figs. 2 and 3, vertical sectional views of the same.

Similar letters refer to similar parts throughout the several views.

In the drawings, A A represent an ordinary wash-boiler. B is a straining device placed therein, the perforated bottom $b$ of which is made slightly rounding, and provided with short legs $d$, which rest on the bottom of the boiler A A, leaving a space which permits a free circulation of the water under the device and up through the perforated bottom $b$.

$c$ represents the handles on the end of the rods $e$, which are attached to the top of the device and jointed at $e'$, so that they may be turned down, as shown at $c'$, so that a cover or lid may be placed on the boiler when desired.

The sides of the device converge slightly at the top, so that a similar device, B', is enabled to rest thereon.

If desired, the bottom of the upper device may be made flat and the handles placed at one side, as shown; but this is not important, as the same result is accomplished with either construction.

The strainers B B' are preferably made of zinc or other non-rusting material.

In using this device it is filled with the clothes to be boiled and lowered to its position at the bottom of the boiler, which contains the necessary amount of water. The clothes do not come in contact with the boiler, and are thus protected from rust. When sufficiently boiled they are lifted out by the handles $c$, and are thoroughly strained by the perforated bottom $b$. The lighter articles, which require less boiling, may be placed in the upper strainer and lifted out first.

Having thus described my invention, what I claim as new, and desire to secure by Letters Patent, is—

The combination, with the boiler A, of the strainers B B', having inwardly-inclined sides, perforated bottoms, and jointed handles, substantially as shown and described.

ANNA M. DENNISON.

Witnesses:
CHAS. A. KRESSMAN,
THOMAS GALVAN.